Figure 1:
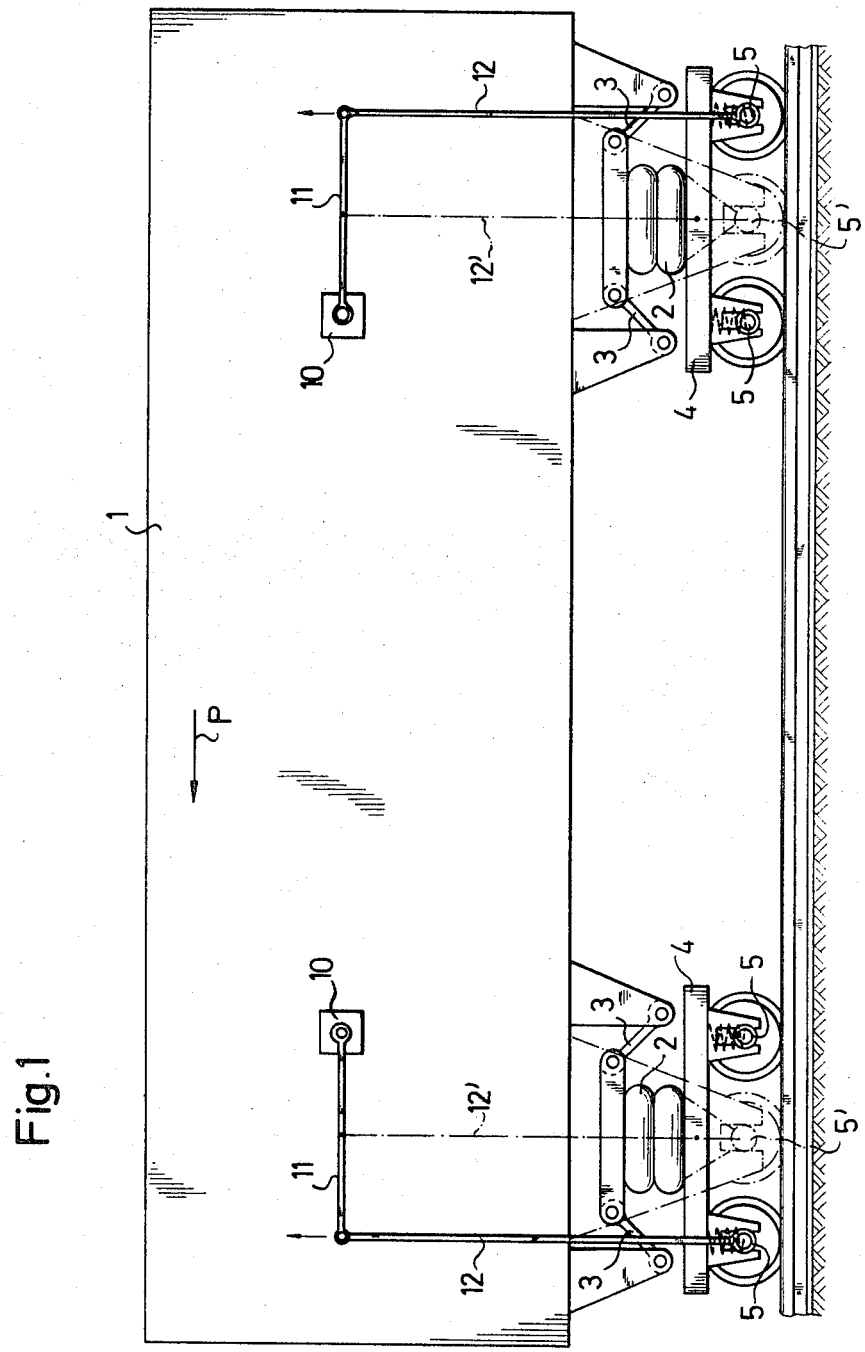

United States Patent [19]

Kreissig et al.

[11] 3,757,702
[45] Sept. 11, 1973

[54] RAILWAY CAR ROLL CONTROLLED BY FLUID SPRING CONTROLLER ASSEMBLY

[75] Inventors: Ernst Florian Kreissig, Seuzach/ZH; Karl Feuerlein, Winterthur, both of Switzerland

[73] Assignee: Sulzer Brothers, Ltd., Winterthur, Switzerland

[22] Filed: Oct. 13, 1971

[21] Appl. No.: 188,845

[30] Foreign Application Priority Data
Nov. 2, 1970 Switzerland.................... 16196/70

[52] U.S. Cl.............. 105/210, 105/199 R, 105/453
[51] Int. Cl........... B61f 3/08, B61f 5/10, B61f 5/36
[58] Field of Search...................... 33/338; 105/164, 105/191 B, 199 R, 210, 215 R, 453; 280/6.1, 112

[56] References Cited
UNITED STATES PATENTS

| 3,683,818 | 8/1972 | Meir et al. .......................... 105/164 |
| 2,167,081 | 7/1939 | Mauzin ............................. 33/338 X |
| 2,353,503 | 7/1944 | Rost et al........................... 280/112 |
| 2,861,523 | 11/1958 | Berry .............................. 105/215 R |
| 3,083,027 | 3/1963 | Lindblom............................ 280/6.1 |
| 3,286,655 | 11/1966 | Lich ............................... 105/197 B |

*Primary Examiner*—Gerald M. Forlenza
*Assistant Examiner*—Howard Beltran
*Attorney*—Kenyon & Kenyon Reilly Carr & Chapin

[57] ABSTRACT

The springs are connected to the pneumatic system over a controller which opens the springs on one side of the vehicle to air pressure while venting the springs on the opposite side to counteract tilting of the vehicle. The controller is actuated by tilt linkage devices between the axles and the body of the vehicle.

5 Claims, 2 Drawing Figures

RAILWAY CAR ROLL CONTROLLED BY FLUID SPRING CONTROLLER ASSEMBLY

This invention relates to a rail vehicle having adjustable springs. More particularly, this invention relates to an apparatus for eliminating tilting of spring mounted rail vehicle bodies.

Rail vehicles have been known wherein a body has been supported via adjustable springs disposed in rows on opposite sides of the longitudinal axis of the body on bogies or directly on wheel axles. Such vehicles have had the springs connected to a pressure medium source by way of springing valves which are connected to the wheel axles. In addition, in the case of electrically powered vehicles, a current collector has been mounted on the body to engage with an electrical contact line so as to deliver power from the line to the vehicle.

However, when current is supplied from an electrical contact line to an air-sprung vehicle, such as a locomotive, by way of a narrow current collector, there is a risk, since the air springs are soft, of the vehicle tilting while negotiating a curve, particularly upon entering a curve, due to centrifugal force. As a result, the collector can leave the contact line.

In order to stabilize a vehicle body transversely against such occurrences, it has been known to use mechanical anti-roll devices, such as torsion shafts. It has also been known to mount the current collectors on the vehicle body roof for transverse displacement so that they always remain centered accurately on the contact line or wire. Unfortunately, considerations of space and weight, not to mention the fact that they are fairly complicated, often make devices of this kind unsatisfactory.

Accordingly, it is an object of the invention to provide a rail vehicle of the kind specified which can be stablizied using very simple means and using a large number of existing elements.

It is another object of the invention to guide a current collector accurately along a contact wire.

Briefly, the invention provides a rail vehicle which is supported by way of pressure adjustable springs with a means to supply a pressure medium to the springs to counteract tilting of the vehicle when traversing a curve.

Generally, the invention is applied to rail vehicles, such as locomotives, which are constructed of a body which is supported on at least a pair of wheel axles, each of which is located at the end of the body, via rows of the adjustable springs. The rows of the springs are disposed on opposite sides of the longitudinal axis of the body and are connected to a pressure medium source. In addition, springing valves are connected to the wheel axles and the springs to selectively open and close the pressure medium source to the springs.

The means to supply the pressure medium to the springs to counteract tilting includes a valve means connected between the pressure medium source and each spring, a tilt detector connected to at least one of the wheel axles, and a controller connected between the tilt detector and the respective valve means. The valve means for each spring includes one valve for opening and closing the spring to the pressure medium source and a second valve for venting the spring, e.g., to atmosphere. The tilt detector serves to detect a tilt of an axle relative to the vehicle body and emits a corresponding signal to the controller. The controller, in turn, serves to selectively open the valves to the springs on one side of the vehicle axis to supply medium thereto while closing the valves to the springs on the opposite side. At the same time, the controller closes the venting valves on the one side while opening the venting valves on the opposite side.

In operation, as a vehicle enters a curve, the tilt of the forward wheel axle is detected and a corresponding signal is emitted to the controller. The various valves are then opened and closed, as the case may be, to introduce pressure medium to the springs on the outside of the body relative to the curve while venting the springs to the inside of the curve. This causes the body to tilt in the same direction as the axle. The degree of tilt can be such as to equal or exceed the axle tilt so as to overcome centrifugal force.

By maintaining the vehicle body level relative to a track, any electrical current collector on the vehicle can be ensured of continuous contact with an electrical contact line.

Figure 2:
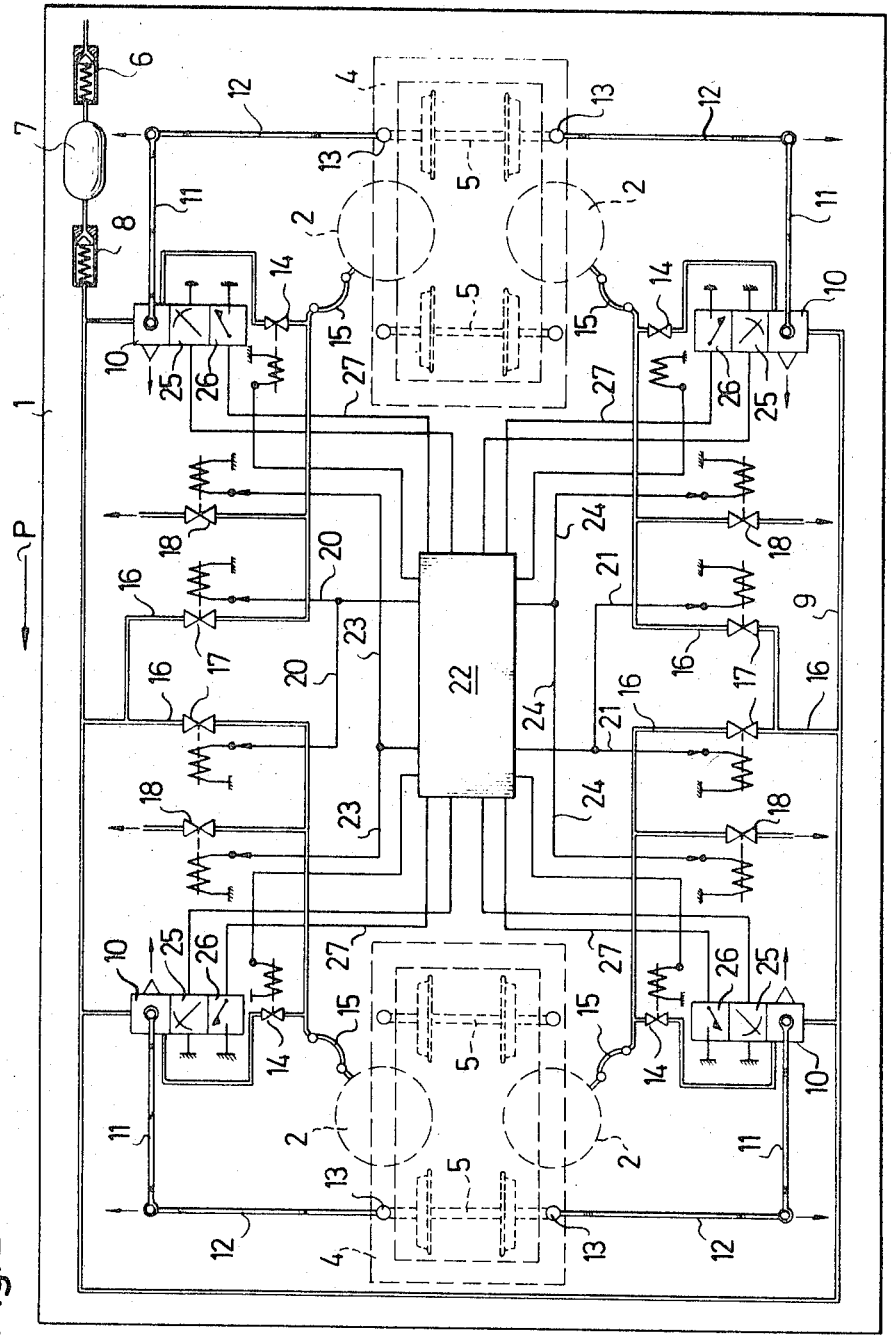

These and other objects and advantages of the invention will become more apparent from the following detailed description and appended claims taken in conjunction with the accompanying drawings in which:

FIG. 1 illustrates a diagrammatic view in side elevation of a locomotive constructed according to the invention; and FIG. 2 illustrates a diagrammatic plan view of the locomotive of FIG. 1.

Referring to FIG. 1, a locomotive comprises a body 1 which is carried by bogies 4 through the interposition of four air springs 2 which, in known manner, are guided by connecting elements 3 relative to body 1. The bogies 4 are each provided with a pair of wheel axles 5 although, as the chain-dotted lines indicate, the air springs 2 can bear directly on axles 5' without any interposed bogies.

Referring to FIG. 2, the air springs 2 are connected to a compressed air source (not shown), such as a compressor, by way of an air line 9 in which check valves 6, 8 and a reservoir 7 are interposed. In order to control the flow of air to the springs 2, suitable air springing valves 10 are disposed between the line 9 and each spring 2. The valves 10 are controlled by input levers 11 which are connected by vertical link rods 12 to one end each of the vehicle end axles 5. The rods 12 can be pivoted, e.g. to the axle boxes or if required, the rods 12' can be pivoted to bogey frames (see FIG. 1). In addition, the valves 10 are connected to the various springs 2 by way of electromagnetic shut-off valves 14 and hoses 15.

In the operation of this known system, air is discharged from or supplied to the particular air spring 2 concerned in dependence upon any movement of the end 13 of the particular axle 5 concerned. Consequently, in straight-ahead travel or when on curves, the body 1 is stablized i.e. it is retained, as a rule, perpendicularly to the axles 5 and therefore to the track.

In order to counteract centrifugal forces, control lines 16 are connected to the air line 9 and extend to the various air springs 2. Each of these lines 16 has an electromagnetic supply valve 17 disposed therein which acts as a control element and which controls the supply of compressed air from the line 9 into a spring 2. Also, additional electromagnetic venting valves 18 are connected to the lines 16 and serve for the discharge of compressed air from the springs 2 to atmosphere. In order to regulate the operation of the respective valves 17, 18, signal lines 20, 21, 23, 24 are connected therefrom to a controller 22. The controller 22 is, in turn, connected to the springing valves 10 so as to be actuated thereby. To this end, each springing valve 10 has an electrically indicating distance-measuring, or vertical movement pick-off, e.g. a potentiometer 25, which detects the position of an end 13 of a respective axle 5 as well as a cam-operated limit switch 26. Signal lines 27 connect the potentiometers 25 to the controller 22, and signal lines 28 connect the switches 26 to controller 22.

In operation, when the locomotive moves in the direction indicated by arrows P in FIGS. 1 and 2 and enters a curve, the outer end 13 of the front axle 5 rises relative to the inside end because of the increasing superelevation of the outside rail in the transition curve and also because of the conical shape of the wheel tread. The corresponding potentiometers 25 in the springing valves 10 report this change in position via lines 27 to the controller 22 which, in dependence upon the signals, operates in opposite senses, the control elements, i.e. valves 17, 18 of the air springs 2 on both sides so that tilting of the body 1 is opposed by centrifugal force. For instance, if, in accordance with the direction of the curve, the valves 17 on one side open so that the pressure in the springs 2 on the same side increases, the valves 18 associated with the other side open so that air discharges from the springs 2 on that side and the pressure on that side therefore drops. The vehicle body 1 is thus tilted in the same direction of the wheel axle 5 and continues until the controller 22 is deactivated when the body 1 becomes perpendicular to the axle 5 having the tilt detector thereon. The position of the body 1 therefore adapts to the position of the axle 5 entering the curve and opposes centrifugal forces.

The opposing effect of the apparatus can be of such an extent that the body 1 is perpendicular to the rails at the place of one of the axles 5. For instance, the front axle which is the first to enter a curve can be used to control tilting. Alternatively, the control can depend upon the position of the trailing axle. This ensures that the current collector (not shown) is always in a definite position above the rails, thus making it difficult, if not impossible, for the collector to leave the contact wire (not shown).

The opposition to centrifugal forces can be carried to an extent such that the locomotive body 1 is tilted into the curve beyond the position perpendicular to the track to completely or partly compensate for the centrifugal force effect. The controller 22, in this case, would operate whenever the axles 5 are at an inclination to one another and to the body 1. The action of the controller 22 ceases once the axles 5 are parallel to one another.

It is noted that the potentiometers 25 of any one axle 5 operate together as tilt detectors, since tilting of the axle 5 relative to the body 1 can be determined from the difference between the signals output by such potentiometers. One of the functions of the controller 22 is to make this determination.

An end position limitation of the body 1 can be provided by means of the switches 26 which are operated by way of appropriate cams (not shown) via the rod 12 and lever 11. When the switch 26 associated with the particular end 13 concerned is operated, as a rule, the switch associated with that end of the front axle which is on the inside of the curve, the controller 22 ceases operating and closes the previously open valves 17, 18.

To prevent the operations of the controller 22 from reacting unwantedly on the normal operation of the air springs 2, the valves 14 in the lines from the valves 10 to the springs 2 are connected by electrical wiring 30 to the controller 22 and are actuated by the controller 22 to close simultaneously whenever the controller 22 operates the valves 17, 18. This reaction can, of course, be obviated or reduced to a negligible value by other means, e.g. by an appropriate choice of the sensitivity ranges of the valves 10 or by throttling the air supplied therethrough to the springs 2.

The invention, although disclosed with reference to a locomotive, is not of course limited to locomotives and is of general use for rail vehicles. The adjustable springs need not be air springs as described above but can be springs of some other kind such as hydropneumatic or hydraulic springs.

What is claimed is:

1. In combination with a rail vehicle having a body, at least a pair of wheel axles supporting said body at the respective ends thereof, a plurality of rows of adjusting springs between said body and said wheel axles, said rows of springs being disposed on opposite sides of a longitudinal axis of said body, and a pressure medium source;

valve means connected between said pressure medium source and each said spring for selectively supplying and removing pressure medium thereto and therefrom;

a tilt detector connected to at least one of said axles for detecting a tilting of said one axle relative to said body and the other axle; and a controller connected between said tilt detector and said valve means for actuating said valve means in response to said tilt detector detecting a tilt in said one axle relative to said body and said other axle whereby pressure medium is supplied to said springs on one side of said axis and removed from said springs on the opposite side of said axis to tilt said body in the direction of tilt of said one axle in opposition to centrifugal force on said body to maintain said body perpendicular to said one axle.

2. The combination as set forth in claim 1 which further includes springing valves for selectively opening and closing said source to said springs, valve actuating means connected to said wheel axles and said springing valves to sense a distance change between said body and said axles and a shut-off valve between said respective spring and each respective springing valve, each shut-off valve being connected to said controller for closing in response to actuation of said valve means.

3. The combination as set forth in claim 2 wherein said tilt detector includes a pair of vertical movement pick-offs connected to the respective ends of said one axle.

4. The combination as set forth in claim 3 wherein each pick-off is integral with a respective springing valve.

5. The combination as set forth in claim 1 wherein said valve means includes supply valves for supplying pressure medium to each respective spring and venting valves for discharging pressure medium to each respective spring, said supply valve and said venting valve connected to a respective spring being operated in opposite sense to each other and said supply valves on one side of said axis of said body being operated in opposite sense to each other.

* * * * *